Oct. 3, 1961   G. W. BARNES   3,003,095
ELECTRICAL MACHINES

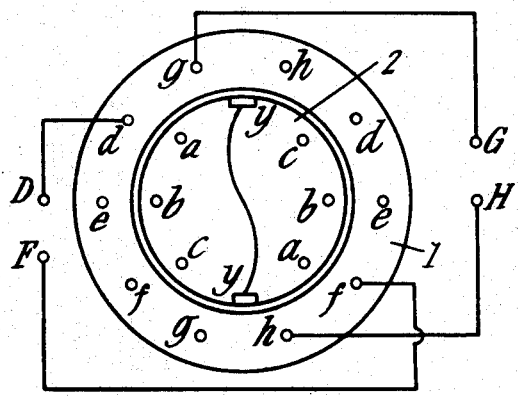
Fig.1.
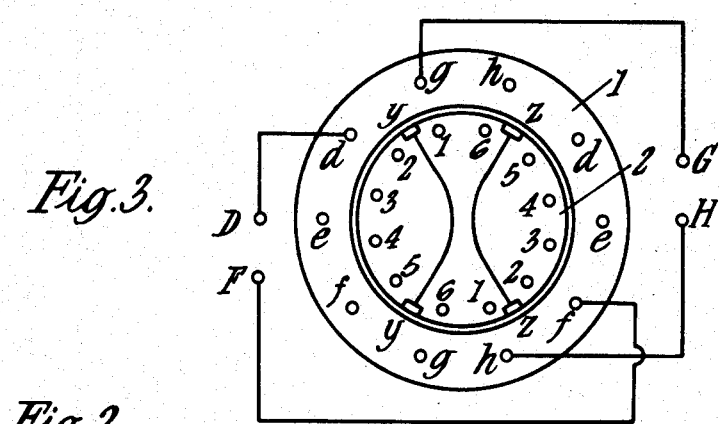
Fig.3.
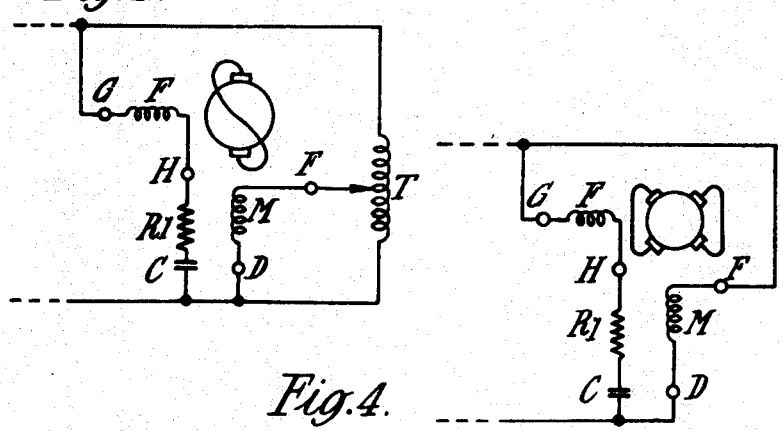
Fig.2.
Fig.4.

Filed May 12, 1958   2 Sheets-Sheet 2

Inventor
G. W. Barnes
By Hancock Downing Seebold
Attys.

United States Patent Office 3,003,095
Patented Oct. 3, 1961

3,003,095
ELECTRICAL MACHINES
Geoffrey Walter Barnes, Johannesburg, Transvaal, Union of South Africa, assignor to Easun Electrical (Proprietary) Limited, Johannesburg, Transvaal, Union of South Africa
Filed May 12, 1958, Ser. No. 734,499
Claims priority, application Great Britain May 14, 1957
6 Claims. (Cl. 318—194)

This invention relates to electrical machines of the type whose operation depends on the interaction of a magnetic field and an armature disposed within or about the said field, the purpose of this combination being to produce a mechanical result from an electrical condition and vice versa, as for example electric motors, generators and rotating amplifiers, and in which electrical connection to the moving component of the machine is afforded by a commutator. In particular, this invention relates to motors, generators and rotating amplifiers intended primarily for alternating current but, in some cases, also usable on direct current.

It is an object of the present invention to provide an improved electrical machine of the type indicated.

Figure 5:
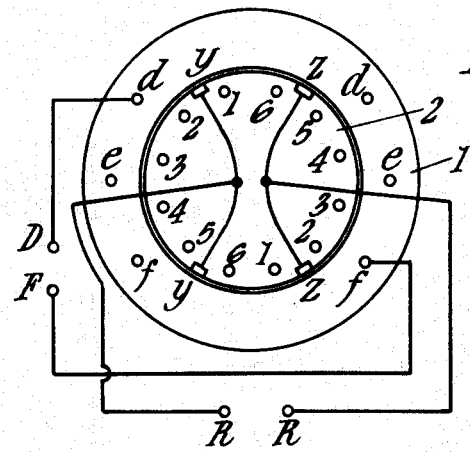
Figure 6:
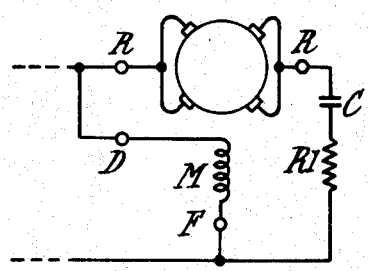

In the accompanying drawings:

FIGURE 1 shows diagrammatically one form of electrical machine according to the present invention, FIGURE 2 shows diagrammatically one form of circuit connection for the machine shown in FIGURE 1, FIGURE 3 shows diagrammatically an alternative form of electrical machine according to the present invention, FIGURE 4 shows diagrammatically one form of circuit connection for the machine shown in FIGURE 3, FIGURE 5 shows diagrammatically a further alternative form of electrical machine according to the present invention, and FIGURE 6 shows diagrammatically one form of circuit connection for the machine shown in FIGURE 5.

In carrying the invention into effect according to one convenient mode by way of example as shown in FIGURE 1 an electrical motor comprises a stator 1 and a rotor 2 of which the stator 1 is provided with two separate electrical windings DF and GH distributed in conventional stator slots and disposed such that the axes of their associated fields are mutually perpendicular, and the rotor 2 is wound with a number of angularly spaced coils aa, bb and cc connected in series and commutated in known manner by the pair of brushes yy.

The brushes yy are located with their axes perpendicular to the axis of the magnetic field associated with the stator winding G—g—g—h—h—H which forms the field winding, and thus perpendicular to the field axis of the other winding D—d—d—e—e—f—f—F to which the excitation is applied and thus may conveniently be referred to hereinafter as the motive winding DF (M).

The commutator brushes y, y, are connected to each other such that the short-circuited rotor turns of the rotor winding provide inductive compensation for the motive winding M. This arrangement has the advantage that the motive winding M does not include a commutator in its circuit and thus may be wound for any practical voltage without being limited by the commutator bar insulation.

One suitable form of circuit arrangement for an A.C. motor of this construction is shown in FIGURE 2. The field winding F and the motive winding M are effectively connected in shunt across the alternating current supply. The motive winding M is energized by a variable ratio auto-transformer to provide a means of controlling the speed of the motor and a resistor $R_1$ and a condenser C are connected in series with the field winding F to relate the phase of the current in this winding to that of the current in the motive winding M, to provide the torque required.

The motor may be reversed by reversing the field winding F or the motive winding M or by reversing the current flowing in either.

In an alternative arrangement as shown in FIGURE 3, each brush y is replaced by a pair of brushes yz, each brush y or z of one pair being connected to a brush y or z respectively of the other pair such that the rotor turns between the adjacent pairs of brushes not short-circuited over the arcs Y—z are adjacent the turns of the field winding, and are more or less parallel to the magnetic field of the motive winding M. In this way compensation is provided over the arcs y—y and z—z between adjacent short circuited brushes by the mutual effect of the rotor and stator turns within these arcs.

In one form of circuit connection as shown in FIGURE 4, the field F and motive M windings are shunt connected as before.

In a further alternative arrangement as shown in FIGURES 5 and 6, the field connection is made to the two short-circuited pairs of brushes and thus the field winding eliminated. The turns of the rotor winding over the arcs between the adjacent short-circuited brushes form the field winding and armature compensation is effected over these arcs by the short circuited turn on the rotor.

With this arrangement, the brush resistance appearing in the excitation winding can be made lower than that in the previously described arrangement in which the entire brush resistance is reflected into the motive winding.

In the foregoing only two-pole machines have been described, but multi-polar may also be constructed according to the present invention and likewise although only single phase alternating current machines have been described, polyphase machines may also be constructed.

Although the foregoing description has been directed exclusively to electrical motors it is to be understood that the machines as previously described may be used as self-excited or separately excited generators, or as rotating amplifiers.

The machine as hereinbefore described may with advantage be used in an electrical regulating system as is described in United States application Serial No. 734,461.

If desired, in the arrangements shown in FIGURE 5, the rotor connections RR may be connected into the circuit not directly as shown in FIGURE 6 but indirectly by means of a transformer to assist in matching the impedance to the supply.

As has previously been described, a resistor $R_1$ and condenser C are connected in series in the field circuit to bring the phase of the current in the field circuit sufficiently near to the potential across the motive winding M. In practice a phase difference of 20° and frequently more has been found tolerable.

If desired, the motive winding M may also have a condenser connected in series with it (not shown) to compensate for the residual inductance of this winding.

I claim:

1. An alternating current commutator motor comprising a stator, a motive winding and a field winding located upon said stator, at least one pair of commutator brushes short-circuited and connected only to each other, an impedance comprising a fixed resistor and a condenser connected in series with each other and with the field winding to constitute a series combination, which impedance suitably relates and stabilizes in operation the phase of the current in the field winding to the potential across the motive winding, and a variable-ratio transformer having primary winding means connected in parallel with said series combination of field winding and impedance and secondary winding means connected across said motive winding.

2. An alternating current commutator motor including a stator, a motive winding located upon said stator, a pair of commutator brushes electrically connected to each other and located on one side of the magnetic axis of the motive winding, a second pair of commutator brushes electrically connected to each other and located on the other side of the magnetic axis of the motive winding symmetrically with respect to the first pair, a field circuit electrically connected in parallel with the motive winding, and an impedance, including a fixed resistor and a capacitor, connected in series in the field circuit to suitably relate and stabilize in operation the phase of the current in the field circuit in relation to the potential across the motive winding.

3. An alternating current commutator motor comprising a stator, a motive and a field winding located upon said stator, pairs of commutator brushes located symmetrically one on each side of the magnetc axis of the motive winding, each brush being electrically connected only to the other brush of its pair, an impedance, including a fixed resistor and a capacitor, connected in series with said field winding to constitute a series combination to suitably relate and stabilize in operation the phase of the current in the field winding to the potential across the motive winding so that the phase of the field winding current lies in the range between in phase and lagging by about 20°, and means connecting the said motive winding in parallel with said series combination of field winding and impedance.

4. An alternating current commutator motor comprising a stator, a motive winding located upon said stator, a pair of short-circuited commutator brushes located symmetrically one pair on each side of the magnetic axis of the motive winding, an impedance, including a fixed resistor and a capacitor, connected to one pair of short-circuited brushes to form a series combination with the armature of the motor, the impedance suitably relating and stabilizing in operation the phase of the current in the field circuit, constituted by the armature turns under the brushes, to the potential across the motive winding so that the phase of the field winding current lies in the range between in phase and lagging by about 20°, and means connecting the motive winding in parallel with said series combination form the field circuit.

5. A variable speed alternating current commutator motor comprising a stator, a motive winding located upon said stator, a field circuit, a fixed resistor and a fixed capacitor connected in series with said field circuit, means connecting said field circuit and said fixed resistor and capacitor in shunt with the motive winding, and means for adjusting the potential applied to the motive winding independently of that applied to the field circuit so as to vary the speed of the motor, said resistor and capacitor having values appropriate to establish a suitable phase relationship between the phase of the current in the field circuit to the potential across the motive winding during operation of the motor at any speed.

6. An alternating current commutator motor comprising a stator, a motive winding located upon said stator, a field circuit, a fixed resistor and a capacitor connected in series with each other and with said field circuit, and means connecting said field circuit and said fixed resistor and capacitor in shunt with said motive winding, the fixed resistor and capacitor having values appropriate to establish a suitable stable relationship between the phase of the current in the field circuit to the potential across the motive winding during operation of the device.

References Cited in the file of this patent
UNITED STATES PATENTS

| | | |
|---|---|---|
| 963,678 | Arnold et al. | July 5, 1910 |
| 1,874,380 | Soller et al. | Aug. 30, 1932 |
| 2,060,106 | Norcross | Nov. 10, 1936 |